United States Patent
Parekh

[11] Patent Number: 5,922,265
[45] Date of Patent: Jul. 13, 1999

[54] METHOD OF FORMING A MOTOR VEHICLE DASH INSULATOR

[75] Inventor: Vinod Rai Parekh, Mechanicsburg, Pa.

[73] Assignee: Lear Corporation, Southfield, Mich.

[21] Appl. No.: 08/832,820

[22] Filed: Apr. 4, 1997

[51] Int. Cl.[6] .............................. B29C 70/34; B29C 70/78
[52] U.S. Cl. .................... 264/257; 264/45.1; 264/324; 264/325; 264/271.1; 425/375
[58] Field of Search ..................... 264/257, 258, 264/324, 325, 45.1, 271.1, 279, 279.1; 425/375

[56] References Cited

U.S. PATENT DOCUMENTS

| | | | |
|---|---|---|---|
| 4,247,513 | 1/1981 | Liu | 264/249 |
| 4,849,147 | 7/1989 | Freeman | 264/258 |
| 4,873,045 | 10/1989 | Fujita et al. | 264/259 |
| 5,049,325 | 9/1991 | Aoki et al. | 264/325 |
| 5,053,179 | 10/1991 | Masui et al. | 264/257 |
| 5,064,714 | 11/1991 | Yamaguchi et al. | 264/257 |
| 5,073,318 | 12/1991 | Rohrlach et al. | 264/257 |
| 5,200,133 | 4/1993 | Dieul et al. | 264/257 |
| 5,326,523 | 7/1994 | Gustavel et al. | 264/257 |
| 5,356,588 | 10/1994 | Hara et al. | 264/257 |
| 5,362,349 | 11/1994 | Zoller | 156/242 |
| 5,389,316 | 2/1995 | Kerman | 264/257 |
| 5,411,688 | 5/1995 | Morrison et al. | 264/45.4 |
| 5,413,661 | 5/1995 | Spengler et al. | 156/515 |
| 5,453,240 | 9/1995 | D'Hooren | 264/257 |
| 5,456,957 | 10/1995 | Jackson et al. | 428/31 |
| 5,543,094 | 8/1996 | Hara et al. | 264/46.4 |
| 5,608,957 | 3/1997 | Hanagan | 264/258 |

*Primary Examiner*—Mathieu D. Vargot
*Attorney, Agent, or Firm*—Brooks & Kushman P.C.

[57] ABSTRACT

A method is disclosed for forming a motor vehicle dash insulator. The method comprises providing an acoustical absorber proximate a first mold half, and providing a second mold half having first and second ends. Barrier material is delivered into the second mold half from a first location in the second mold half and generally toward either the first end or the second end of the second mold half. The delivery of the barrier melt is interrupted, and redelivery occurs from a second location different from the first location and generally toward either the first end or the second end of the second mold half. The mold is closed to bond the acoustical absorber to the barrier material.

42 Claims, 3 Drawing Sheets

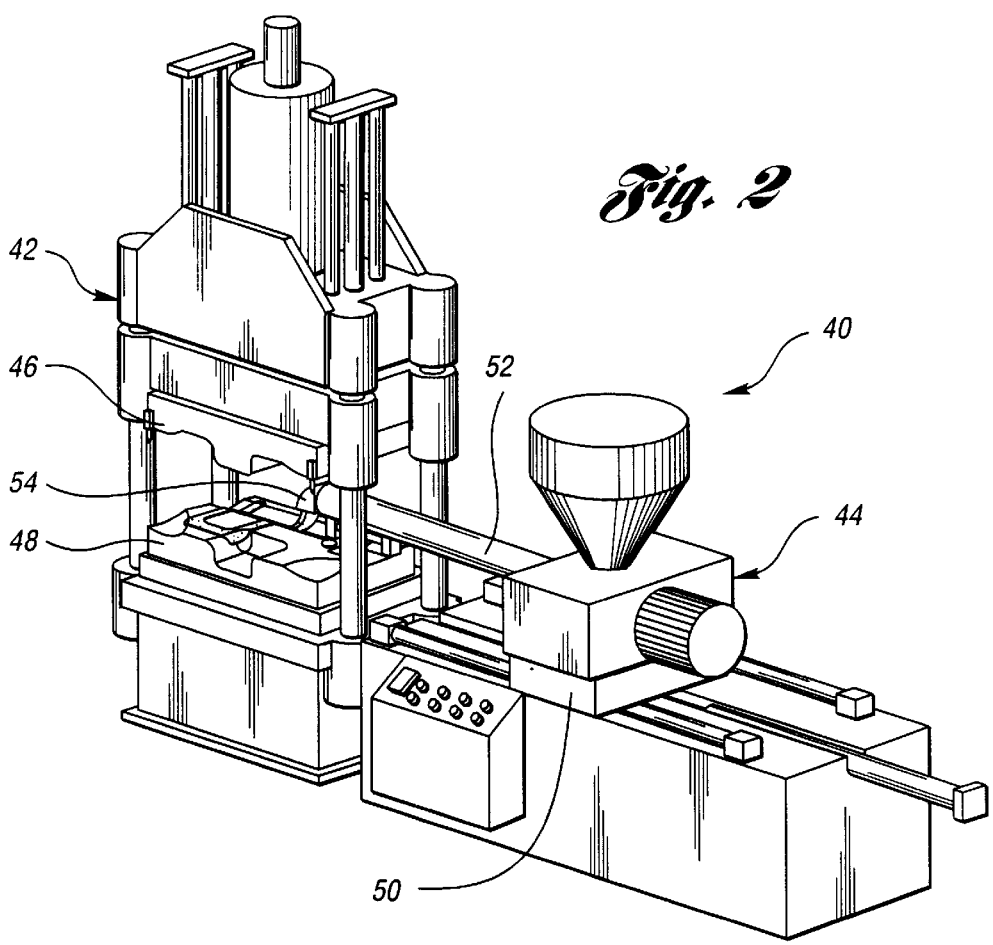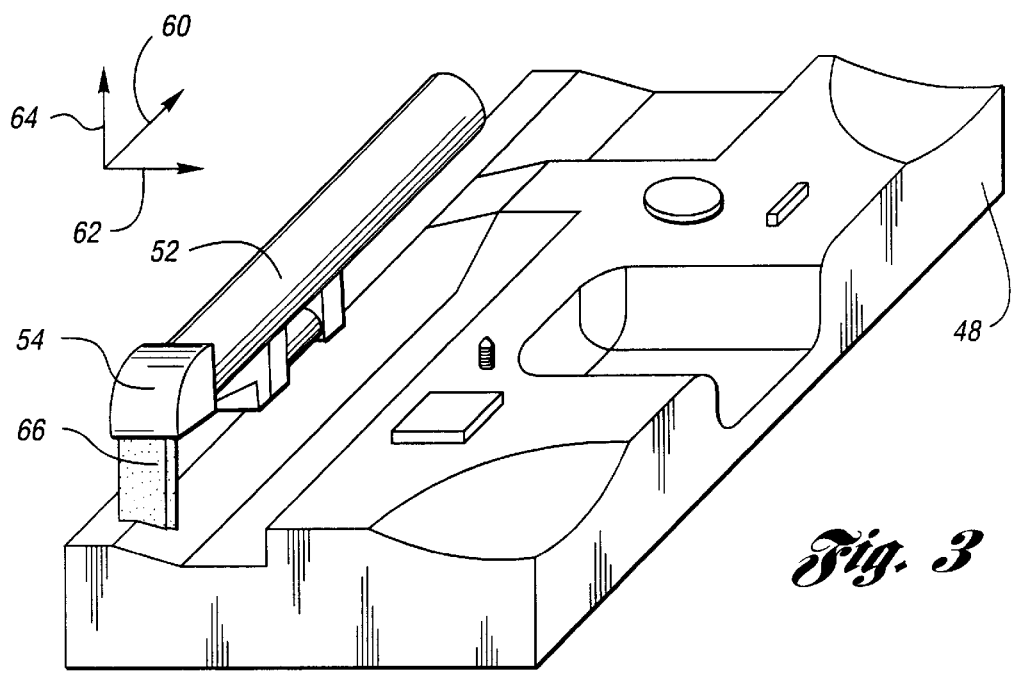

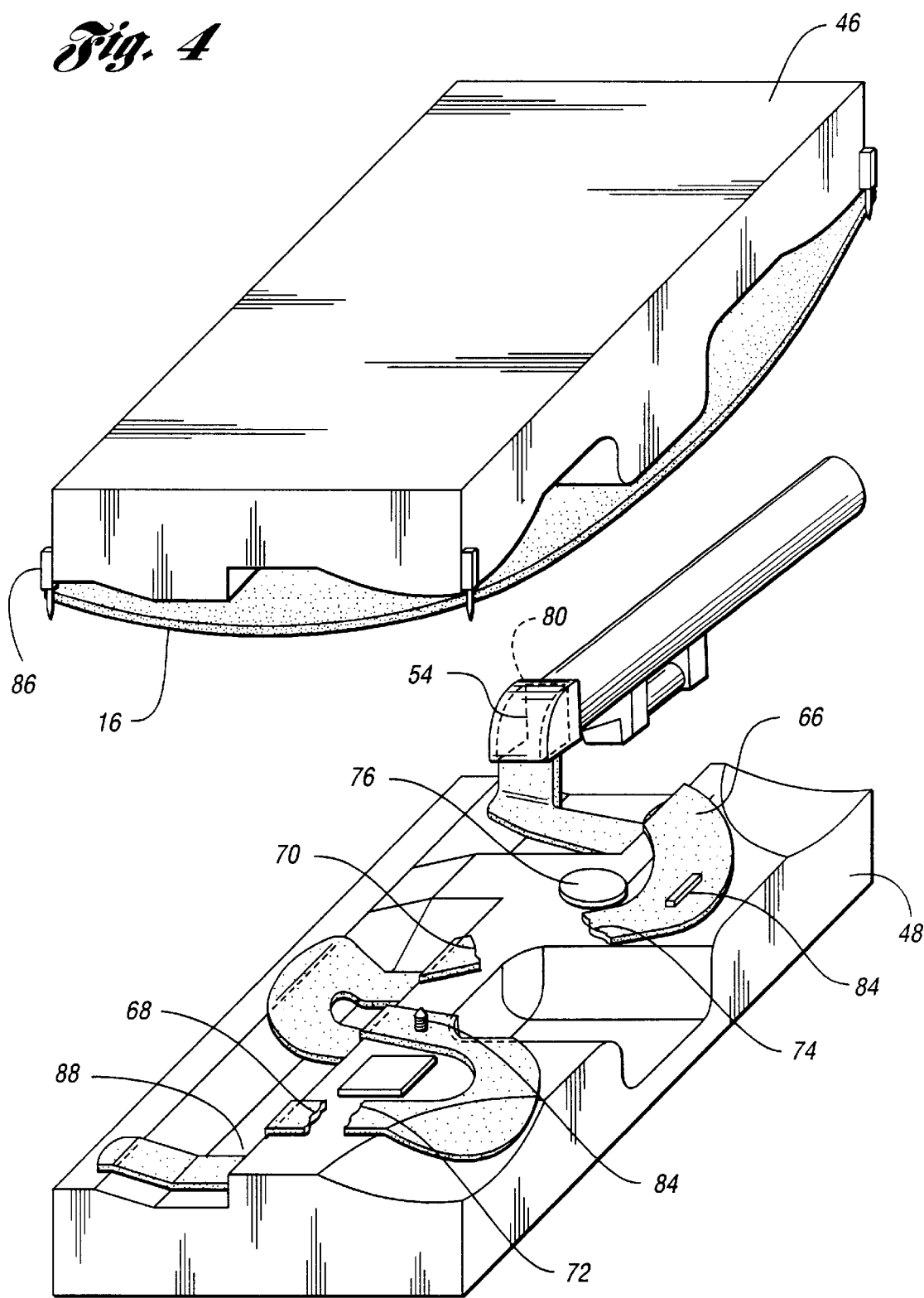

METHOD OF FORMING A MOTOR VEHICLE DASH INSULATOR

TECHNICAL FIELD

This invention relates to dash insulators for motor vehicles, and more particularly to a method of forming a dash insulator using ultra low pressure molding.

BACKGROUND ART

Dash insulators are often mounted in motor vehicles inside the passenger compartment and against a metallic fire wall which separates the passenger compartment from an engine compartment. The primary purpose of the dash insulator is to reduce the transmission of noise and heat from the engine compartment into the passenger compartment. To address this purpose, conventional dash insulators consist of an acoustical absorber such as an open-cell polyurethane foam or a resinated fiber pad which faces the fire wall, and a barrier such as a heavily filled thermoplastic material. Mechanical fasteners, stiffeners and spacers may also be attached to the dash insulator.

Dash insulator barriers are conventionally produced in a compounding process followed by an extrusion or calendering process to achieve a barrier sheet of desired thickness and width. The sheet is bonded to a foam slab stock using an appropriate adhesive. It is then heated under infrared heaters, thermoformed in a three-dimensional mold, trimmed on a trim press and then provided with the necessary attachments in an assembly process. Alternatively, the slab foam sheet may be replaced by a foam-in-place polyurethane absorber. In this alternative process, the barrier sheet is first thermoformed, and then a urethane foam is injected behind the thermoformed barrier sheet. That subassembly is then cured, trimmed and finished as in the above case.

In another alternative, a standard injection molding process is used to produce the three-dimensional barrier, and then the urethane foam absorber is glued to the barrier. Because the parts are very large, and the wall thicknesses are very low, it is necessary to use very large tonnage injection molding machines, i.e. on the order of 2000 to 4000 tons.

SUMMARY OF THE INVENTION

The present invention is a method of forming a dash insulator for a motor vehicle. The method comprises providing an acoustical absorber proximate a first mold half, and providing a second mold half having first and second ends. Barrier material is delivered into the second mold half from a first location in the second mold half and generally toward either the first end or the second end of the second mold half. The delivery of the barrier melt is interrupted, and redelivery occurs from a second location different from the first location and generally toward either the first end or the second end of the second mold half. The mold is closed to bond the acoustical absorber to the barrier material.

Accordingly, it is an object of the present invention to provide a method of the type described above which eliminates the trimming process.

Another object of the present invention is to provide a method of the type described above which provides different barrier wall thicknesses in different areas of the dash insulator according to the anticipated local noise.

Still another object of the present invention is to provide a method of the type described above which provides a dash insulator having a better fit and finish than what is technically feasible in current thermoforming processes.

Still another object of the present invention is to provide a method of the type described above which includes the insertion of fasteners, stiffeners, spacers, wiring holders and other attachments in the molding process, or provides the formation of these components in the molding process.

Still another object of the present invention is to provide a method of the type described above which uses ultra-low injection/compression pressures in comparison to the standard injection molding process in order to reduces the required clamp tonnage by a factor of 3 to 5.

Still another object of the present invention is to provide a dash insulator formed by a method of the type described above.

These and other objects, features, and advantages of the present invention are readily apparent from the following detailed description of the best mode for carrying out the invention when taken in conjunction with the accompanying drawings.

BRIEF DESCRIPTION OF THE DRAWINGS

FIG. 2 is a perspective view of a machine for forming the dash insulator;

FIG. 3 is a perspective view of an extruder head of the ultra low pressure injection molding machine shown in FIG. 2 near the beginning of delivery of plastic barrier melt on top of a bottom mold half; and FIG. 4 is a perspective view of the extruder head near the end of the delivery of plastic barrier melt on top of the bottom mold.

BEST MODE FOR CARRYING OUT THE INVENTION

Figure 1:
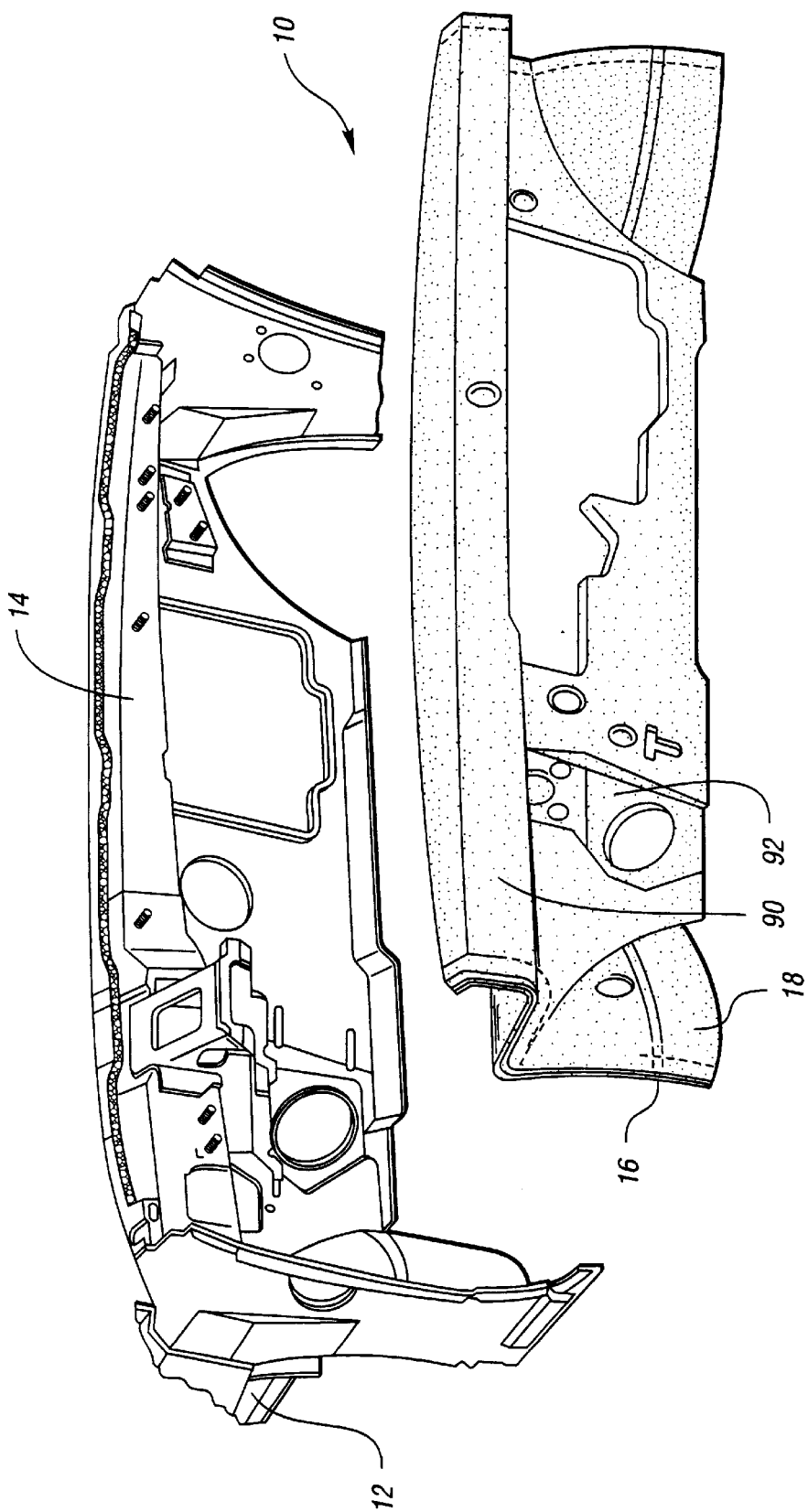
FIG. 1 is an exploded perspective view of a dash insulator according to the present invention and a sheet metal interior wall of a motor vehicle.

With reference to the drawings, the preferred embodiments of the present invention will be described. FIG. 1 shows a dash insulator 10 according to the present invention for reducing noise and heat transmitted from an engine compartment of a motor vehicle 12 into the passenger compartment. The dash insulator 10 is adapted to be mounted inside the passenger compartment of the vehicle against substantially the width of a metallic fire wall 14 that separates the engine compartment from the passenger compartment. The dash insulator 10 includes an acoustical absorber 16 adapted to face the fire wall 14 and a barrier 18.

FIG. 2 shows an ultra low pressure injection molding machine 40 for manufacturing the dash insulator 10. The injection molding machine 40 comprises a press or clamp 42 and a traversing injection unit 44. The press 42 is oriented generally vertically, and holds horizontally disposed therein an upper mold half 46 for forming a firewall side of the dash insulator 10, and a lower mold half 48 for forming the passenger compartment side of the dash insulator. The injection unit 44 is mounted on a table 50, and includes an extrusion barrel 52 and an extruder head 54. The table 50 is movable by several hydraulic cylinders, threaded spindles and ball screws driven by servo motor drives, or rack and pinions to travel in the x, y and z axes such that the extruder head 54 is similarly movable in three dimensions between the two mold halves 46 and 48.

FIG. 3 shows the lower mold half 48, which defines a grid having a longitudinal or x-axis 60 and a lateral or y-axis 62. From an initial position such as one proximate one end of the lower mold half 48 as shown in FIG. 3, the extruder head 54 is movable over the lower mold half in the longitudinal and lateral directions. During this travel, the extruder head preferably maintains a constant distance from the local surface of the lower mold half 48 by also translating in a z-axis 64, and delivers at low pressure a thermoplastic barrier material or melt 66 in a molten condition into the second mold half during at least a portion of its movement. Preferably, the material 66 is heated sufficiently to attain a low enough viscosity to allow spreading of the melt under minimum press pressure. The precise melt conditions and temperatures are dependent upon the contours of the mold and the rheology of the material. Preferably, the barrier material 66 comprises polyvinylchloride, ethylvinylacetate, a polyolefin or other polymer which is heavily loaded with an organic filler such as calcium carbonate or barium sulfate from 30 to 80 percent by weight.

To produce the dash insulator 10, the extruder head 54 ultimately moves to the location shown in FIG. 4 having x- and y-, and optionally z-, coordinates different from the x-, y- and z-coordinates of the initial location. Along its path, the extruder head 54 may travel, and thus the barrier material 66 may be laid down, at some points that lie entirely on one side of the longitudinal central axis of the lower mold half 48. The precise path of the extruder head 54 is dependent on the desired wall thickness of the dash insulator barrier 18 and the areas of the mold to be covered. To further achieve the desired wall thicknesses, the extruder head 54 may during its travel interrupt the delivery of the melt 66 such as at locations 68 and 70, and redeliver the melt starting at other locations 72 and 74. These interruptions may occur, for example, at locations on the lower mold half 48 corresponding to breaks in the dash insulator 10 such as proximate projection 76 for the steering column of the vehicle.

The barrier melt 66 exits the extruder head 54 through movable dams 80, and is normally laid down onto the mold surface in the form of a rope or sheet. As it contacts the surface of the lower mold 48, the barrier melt 66 preferably has a width substantially less than a minimum width of the lower mold. The barrier material 66 may also be delivered with a non-uniform width and/or a non-uniform thickness. To accomplish variations in material thickness, the speed of the extruder head 54 across the mold surface can be varied. Alternatively or in conjunction with changes in extruder head speed, the speed of an extruder screw can be varied to vary the amount of barrier material 66 being delivered to the extruder head. To accomplish variations in material width, the dams 80 can be adjusted as the extruder head translates. Finally, fasteners, stiffeners, spacers, wiring holders and/or other attachments 84 may be provided in the lower mold half 48 such that they are integrated into the dash insulator 10. One or more of these components may also be formed in the molding process.

The acoustical absorber or decoupler 16 is held by corner pins 86 proximate the upper mold half 46 during the deposition of the barrier melt. Alternatively, the acoustical absorber 16 may be held proximate the upper mold half by clamps or vacuum, or separately loaded onto the lower mold half after the injection unit has moved out of the press area. The acoustical absorber 16 may comprise a porous open-cell slab foam sheet such as polyurethane or other thermoset material, a resinated waste fiber-based product containing a previously cured thermoset binder, or any other suitable material.

The temperature of the upper mold 46 is preferably maintained as low as possible, on the order of about 5 to 25 degrees C., while the temperature of the lower mold 48 is controlled between 5 and 50 degrees C., by circulating chilled water through channels provided in the mold halves. The amount of cooling may be varied by adjusting the flow rate and temperature of the water. The temperature of the die 54 preferably varies between about 170 and 215 degrees C.

After deposition of the barrier melt 66, and preferably before the barrier melt significantly cools, the press 42 closes the mold halves 46 and 48. A pressure of between about 50 and 100 kilograms per square centimeter (710–1422 pounds per square inch), and preferably between about 25 and 80 kg/cm$^2$, is developed as measured on the surface of the mold, which compresses the acoustical absorber 16 and forces the barrier material 66 to flow and fill the three-dimensional contours of the mold halves 46 and 48. The barrier melt 66 at least partially penetrates the acoustical absorber 16 such that when the melt thereafter cools to form the barrier 18, it also tightly bonds to the acoustical absorber.

The barrier 18 formed by this process is preferably between about 1.5 and 5 millimeters (mm) thick, and more preferably about 2.5 to 4 mm thick. Impressions 88 on the lower mold half 48 form areas 90 shown in FIG. 1 of relatively greater wall thickness and corresponding strength and noise absorbtion capacity. Other areas of the barrier 18, such as area 92, are more thin to reduce the overall weight and cost of the part.

The dash insulator 10 made according to the method of the present invention does not require trimming, and thus saves significant time and cost over prior art methods, while at the same time achieving a better fit and finish than what is technically feasible in conventional thermoforming processes. Additionally, the present invention allows thinner wall thicknesses for large parts such as the dash insulator 10, with minimum inner stresses, as compared to conventional injection molding processes. Moreover, the pressures developed in the present method are exceedingly low in comparison to standard injection molding process, which in turn reduces the necessary clamp tonnage by a factor of 2 to 3. Moreover, the present invention does not require a hot or cold runner system, nor gates for melt injection into the mold.

It should be understood that while the forms of the invention herein shown and described constitute preferred embodiments of the invention, they are not intended to illustrate all possible forms thereof. It should also be understood that the words used are words of description rather than limitation, and various changes may be made without departing from the spirit and scope of the invention disclosed.

I claim:

1. A method of forming a dash insulator for a motor vehicle, the method comprising:

providing a first mold half;

providing an acoustical absorber proximate the first mold half;

providing a second mold half having first and second ends;

delivering a barrier material into the second mold half from a first location in the second mold half and generally toward either the first end or the second end of the second mold half;

interrupting delivery of the barrier melt;

redelivering the barrier melt into the second mold half from a second location in the second mold half different from the first location and generally toward either the first end or the second end of the second mold half; and closing the mold to bond the acoustical absorber to the barrier material.

2. The method of claim 1 wherein the first location is proximate the first end of the second mold half.

3. The method of claim 1 wherein the barrier material has a width less than a minimum width of the second mold half.

4. The method of claim 1 wherein the barrier material has a non-uniform width.

5. The method of claim 1 wherein the barrier material has a non-uniform thickness.

6. The method of claim 1 wherein the closing step comprises closing the mold at a pressure between about 50 and 100 kilograms per square centimeter.

7. The method of claim 1 wherein the acoustical absorber comprises open-cell foam.

8. The method of claim 1 wherein the acoustical absorber comprises polyurethane.

9. The method of claim 1 wherein the acoustical absorber comprises fiber.

10. The method of claim 1 wherein the first mold half is disposed in a generally horizontal plane.

11. The method of claim 1 wherein the second mold half includes at least one impression.

12. The method of claim 1 further comprising providing fasteners in the second mold half.

13. The method of claim 1 wherein the delivering step comprises delivering the barrier material from a traversing injection unit.

14. The method of claim 1 wherein the delivering step comprises extruding the barrier material from a traversing injection unit.

15. A method of forming a dash insulator for a motor vehicle, the method comprising:

providing a first mold half;

providing an acoustical absorber proximate the first mold half;

providing a second mold half having a longitudinal axis;

delivering a barrier material into the second mold half from a first location in the second mold half to a second location in the second mold half, the barrier material lying entirely on one side of the longitudinal axis at at least one point between the first location and the second location; and closing the mold to bond the acoustical absorber to the barrier material.

16. The method of claim 15 wherein the first location is proximate the first end of the second mold half.

17. The method of claim 15 wherein the barrier material has a width less than a minimum width of the second mold half.

18. The method of claim 15 wherein the barrier material has a non-uniform width.

19. The method of claim 15 wherein the barrier material has a non-uniform thickness.

20. The method of claim 15 wherein the closing step comprises closing the mold at a pressure between about 50 and 100 kilograms per square centimeter.

21. The method of claim 15 wherein the acoustical absorber comprises open-cell foam.

22. The method of claim 15 wherein the acoustical absorber comprises polyurethane.

23. The method of claim 15 wherein the acoustical absorber comprises fiber.

24. The method of claim 15 wherein the first mold half is disposed in a generally horizontal plane.

25. The method of claim 15 wherein the second mold half includes at least one impression.

26. The method of claim 15 further comprising providing fasteners in the second mold half.

27. The method of claim 15 wherein the delivering step comprises delivering the barrier material from a traversing injection unit.

28. The method of claim 15 wherein the delivering step comprises extruding the barrier material from a traversing injection unit.

29. A method of forming a dash insulator for a motor vehicle, the method comprising:

providing a first mold half for forming a first side of the dash barrier;

providing an acoustical absorber proximate the first mold half;

providing a second mold half for forming a second side of the dash barrier, the second mold half defining a grid having x- and y-coordinates;

providing an extruder movable over the second mold half in the longitudinal direction and also movable over the second mold half in the lateral direction;

moving the extruder over the second mold half from a first location to a second location, the first location having a x- and y-coordinates different from x- and y-coordinates of the second location;

delivering from the extruder a barrier material into the second mold half during at least a portion of the movement of the extruder; and closing the mold to bond the acoustical absorber to the barrier material.

30. The method of claim 29 wherein the first location is proximate the first end of the second mold half.

31. The method of claim 29 wherein the barrier material has a width less than a minimum width of the second mold half.

32. The method of claim 29 wherein the barrier material has a non-uniform width.

33. The method of claim 29 wherein the barrier material has a non-uniform thickness.

34. The method of claim 29 wherein the closing step comprises closing the mold at a pressure between about 50 and 100 kilograms per square centimeter.

35. The method of claim 29 wherein the acoustical absorber comprises open-cell foam.

36. The method of claim 29 wherein the acoustical absorber comprises polyurethane.

37. The method of claim 29 wherein the acoustical absorber comprises fiber.

38. The method of claim 29 wherein the first mold half is disposed in a generally horizontal plane.

39. The method of claim 29 wherein the second mold half includes at least one impression.

40. The method of claim 29 further comprising providing fasteners in the second mold half.

41. The method of claim 29 wherein the delivering step comprises delivering the barrier material from a traversing injection unit.

42. The method of claim 29 wherein the delivering step comprises extruding the barrier material from a traversing injection unit.

* * * * *